US006744405B2

(12) United States Patent
Wahl

(10) Patent No.: US 6,744,405 B2
(45) Date of Patent: Jun. 1, 2004

(54) METHOD FOR RECONSTRUCTING THE GAIN/PHASE DIAGRAM OF A TRANSMIT/RECEIVE MODULE OF A PHASED ARRAY ANTENNA

(75) Inventor: Marcus Wahl, Dornstadt-Tomerdingen (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 10/159,291

(22) Filed: Jun. 3, 2002

(65) Prior Publication Data

US 2002/0190899 A1 Dec. 19, 2002

(30) Foreign Application Priority Data

Jun. 2, 2001 (DE) ........................................ 101 27 080

(51) Int. Cl.[7] .............................. H01Q 3/00; G01S 7/40
(52) U.S. Cl. ........................................ 342/377; 342/174
(58) Field of Search .................................. 342/377, 174

(56) References Cited

U.S. PATENT DOCUMENTS 4,994,813 A * 2/1991 Shiramatsu et al. ........ 342/372

FOREIGN PATENT DOCUMENTS

DE 3934155 10/1999
JP 10132880 5/1998
JP 2000199773 7/2000

OTHER PUBLICATIONS

Helmut Wilden, "Microwave tests on prototype–T/R–modules" Radar, 97, Oct. 1997.

* cited by examiner

*Primary Examiner*—Thomas H. Tarcza
*Assistant Examiner*—Fred H Mull
(74) *Attorney, Agent, or Firm*—Crowell & Moring LLP

(57) ABSTRACT

The invention relates to a method for reconstructing the amplitude/phase diagram of a transmit/receive module for a phased-array antenna. This method includes measurement of amplitude and phase of the amplitude/phase states (a, i), where $i=i_{min} \ldots i_{max}$ of an individual amplitude state a; and the measurement of amplitude and phase of the amplitude/phase states (j, b), where $j=j_{min} \ldots j_{max}$ of an individual phase state b. Reconstruction of the amplitude values of an amplitude state x is accomplished by shifting the measured amplitude values of the amplitude state a by the difference ΔA of the measured amplitude values of both amplitude/phase states (x, b), (a, b), which within the phase state b belong simultaneously to the amplitude state x or the amplitude state a. There is also reconstruction of the phase values of a phase state y by shifting the measured phase values of the phase state b by the difference ΔΦ of the measured phase values of both amplitude/phase states (a, y), (a, b), which within the amplitude state a belong simultaneously to the phase state y or the phase state b.

7 Claims, 6 Drawing Sheets

METHOD FOR RECONSTRUCTING THE GAIN/PHASE DIAGRAM OF A TRANSMIT/RECEIVE MODULE OF A PHASED ARRAY ANTENNA

CROSS-REFERENCE TO RELATED APPLICATIONS

This application claims the priority of Application No. 101 27 080.1, filed Jun. 2, 2001, in Germany, the disclosure of which is expressly incorporated by reference herein.

FIELD OF THE INVENTION

The invention relates to a method for reconstructing the amplitude/phase diagram of a transmit/receive module of a phased-array antenna, in particular an active phased-array antenna.

BACKGROUND OF THE INVENTION

In the future, active phased-array antenna radar systems will need a large number of transmit/receive modules at a low cost. The amplitude and phase of these modules can be adjusted (multi-state device). If, for example, a 6 bit phase shifter and a 6-bit amplitude positioner are entered, the result is $2^6 \times 2^6 = 4{,}096$ different amplitude/phase states of the transmit/receive module.

The total amplitude/phase response of a transmit/receive module is usually shown in a so-called amplitude/phase map. FIG. 1 shows an example of such an amplitude/phase diagram. The phase is plotted along the abscissa; the amplitude, along the ordinate. Each individual measurement point inside the two-dimensional amplitude/phase plane represents the measured amplitude and phase for a specific amplitude/phase state of the transmit/receive module.

To control the transmit/receive module in the active phased-array antenna, the total amplitude/phase response in both the receive and the transmit mode must be known in the specified frequency range for each transmit/receive module.

Since it is typical for modern radar systems to have a large number of transmit/receive modules (airborne radar typically has 1,000 transmit/receive modules) with $2^n \times 2^n$ different amplitude/phase states respectively, it is no longer feasible to measure in total all of the amplitude/phase states of each transmit/receive module, first from the viewpoint of an enormously large volume of data and, second from the viewpoint of cost (extremely time consuming).

The article by Wilden, H.: "Microwave Tests on Prototype T/R Modules." IEE International Radar Conference, Edinburgh, pp. 517–521, 1997, discloses the details on the measuring range for testing the transmit/receive modules of a phased-array antenna.

According to DE 39 34 155 C2, the total energy emitted by the transmit/receive elements of a phase array antenna is measured by means of a receive antenna. The amplitude of each transmit/receive element is determined from the change in the total energy, while the phase of each phase shifter of the array antenna is changed.

In JP 2000119773A, to determine the amplitude/phase distribution of a phased-array antenna, the amplitude of a beam of rays is measured while the phase is varied. Then the total distribution is found with the aid of field conversion and repeated calculation until the solution converges.

According to JP 10132880A, to determine the phase distribution of a phased-array antenna, the phase of a transmit element is measured at a fixed frequency for each angle.

Then the phase of an element is measured at a fixed angle for different frequencies. For the non-measured angles or frequencies, the phase is then calculated on the basis of the measurements.

SUMMARY OF THE INVENTION

The object of the invention is to develop a synthesis algorithm, which makes it possible to reduce the number of measurement points and to reconstruct the behavior of the total amplitude/phase response.

This problem is solved with the methods disclosed according to principles of the invention, wherein a method for reconstructing the amplitude/phase diagram of a transmit/receive module for a phased-array antenna, includes measurement of amplitude and phase of the amplitude/phase states (a, i), where $i=i_{min} \ldots i_{max}$ of an individual amplitude state a; and the measurement of amplitude and phase of the amplitude/phase states (j, b), where $j=j_{min} \ldots j_{max}$ of an individual phase state b. Reconstruction of the amplitude values of an amplitude state x is accomplished by shifting the measured amplitude values of the amplitude state a by the difference $\Delta A$ of the measured amplitude values of both amplitude/phase states (x, b), (a, b), which within the phase state b belong simultaneously to the amplitude state x or the amplitude state a. There is also reconstruction of the phase values of a phase state y by shifting the measured phase values of the phase state b by the difference $\Delta\Phi$ of the measured phase values of both amplitude/phase states (a, y), (a, b), which within the amplitude state a belong simultaneously to the phase state y or the phase state b.

With the inventive method, the time and subsequently the cost of characterizing (i.e., measurement data acquisition) the transmit/receive modules can be reduced to a fraction of what is currently needed.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
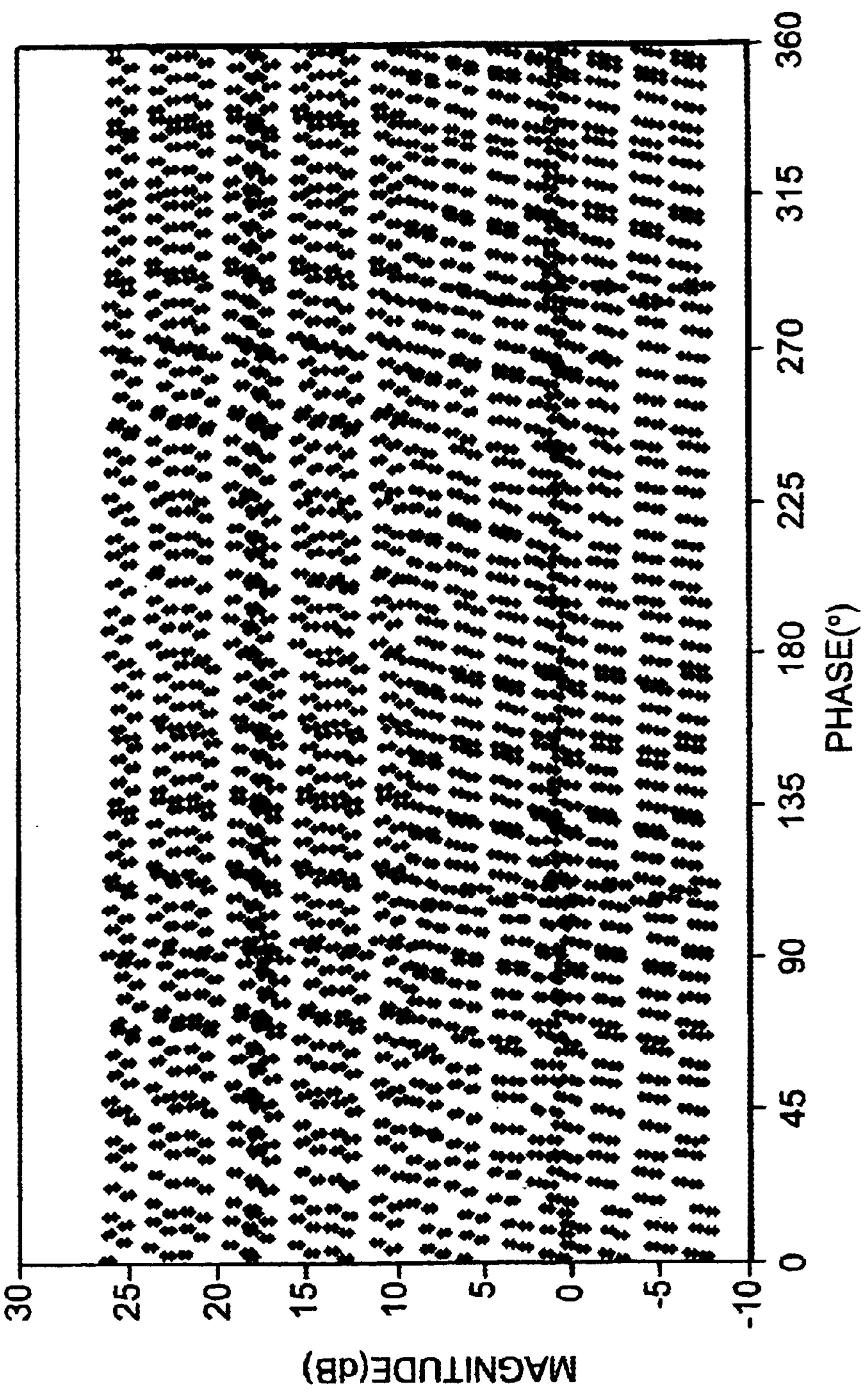
FIG. 1 depicts an example of an amplitude/phase diagram of a transmit/receive module.
Figure 2:
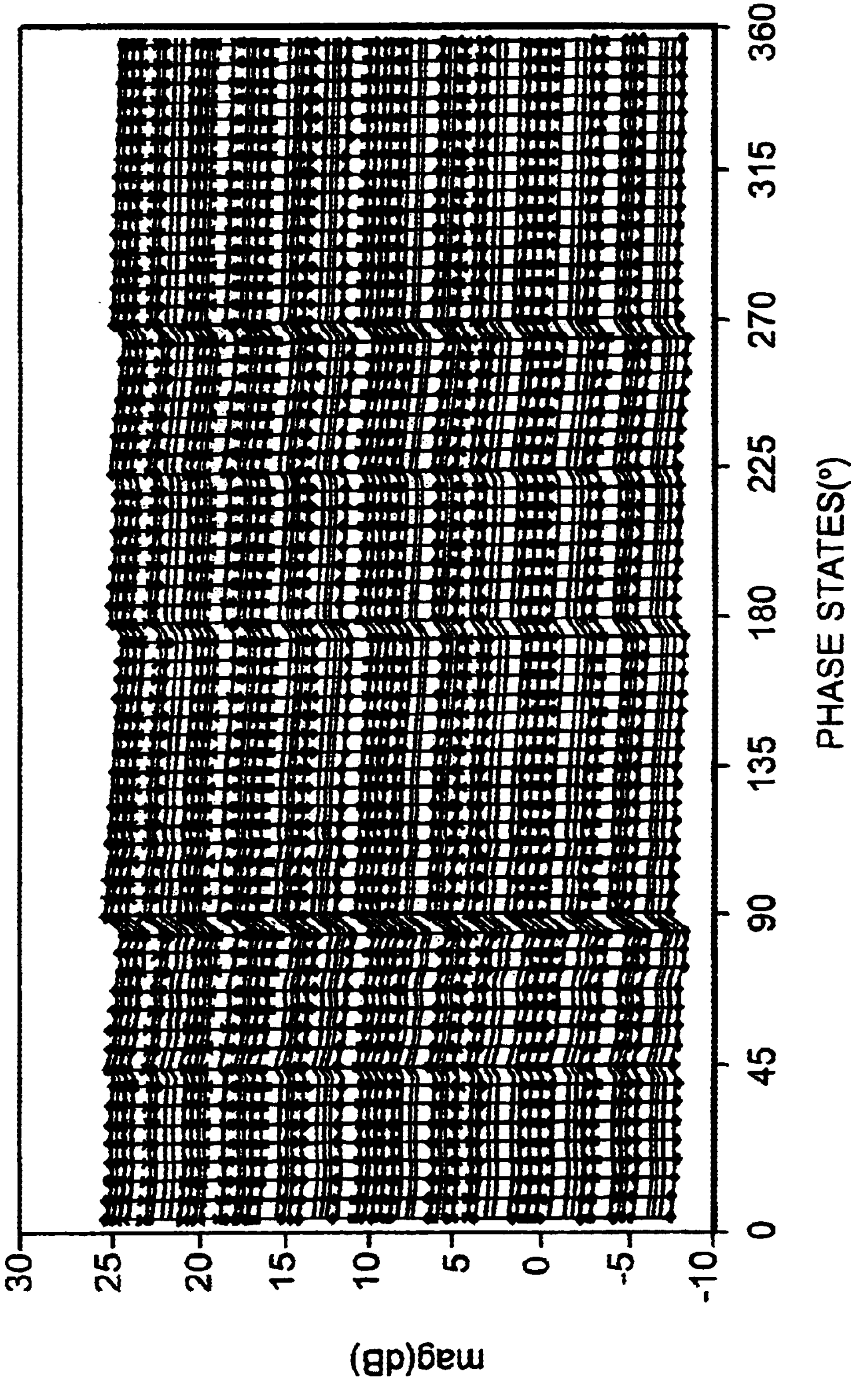
FIG. 2 depicts a curve of amplitude values of individual amplitude states over phase states.

FIG. 2 shows, as an example, a typical curve of the measured amplitude in the individual amplitude states (the amplitudes of the same amplitude state are connected by lines) over the phase states. The amplitude state x is defined as the state of the transmit/receive module at a specific setting x of the amplitude positioner at any arbitrary setting of the phase shifter. The phase state y is defined as the state of the transmit/receive module for a specific setting y of the phase shifter at any arbitrary setting of the amplitude positioner. The amplitude/phase state (x, y) is defined as a state of the transmit/receive module with respect to the amplitude and phase at a specific setting x of the amplitude positioner and y of the phase shifter. The difference between this diagram and the amplitude/phase diagram, according to FIG. 1, is that in FIG. 1 both the amplitude and the phase are the measured values.

In contrast, in FIG. 2 only the amplitude values are determined by means of measurement, whereas, with respect to measuring the phase, one proceeds from ideal modules, i.e., the specified phase values are derived directly from the bit pattern of the phase shifter (phase =set value). It is evident from FIG. 2 that the curves of the individual amplitude states run parallel to each other.

Figure 3:
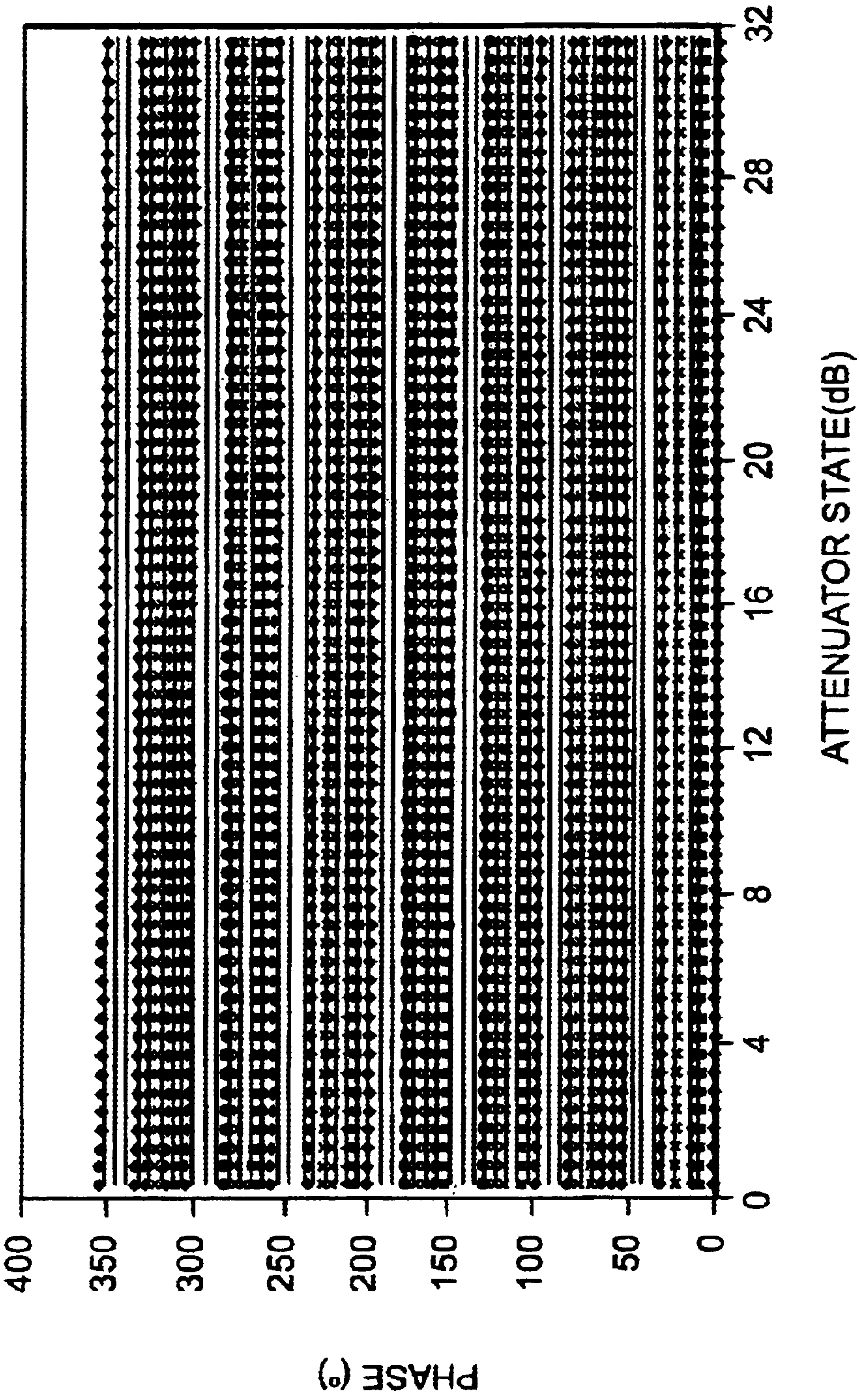
FIG. 3 depicts a curve of phase values of individual phase states over amplitude states.

Simultaneously, the measured phase over the amplitude states (amplitude =set value) exhibits a similar behavior. To this end, FIG. 3, normalized to the phase state 0, shows the curve of the measured phase in the individual phase states (the phases of the same phase state are connected by lines) over the amplitude states.

Therefore, it is quite adequate to determine, according to the amplitude and phase, in the amplitude/phase diagram (FIG. 1) only a part of all amplitude/phase states, namely only one line and one column (corresponding to one amplitude state and one phase state) and to reconstruct all other states. This and other preferred embodiments will be presented below.

As an example, assume that a transmit/receive module is a multistate device with a 6-bit amplitude positioner and a 6-bit phase shifter, i.e., $2^6 \times 2^6$=4,096 amplitude/phase states.

Only one line and one column of an amplitude/phase diagram are supposed to be measured, i.e., instead of 4,096 amplitude/phase states, only 64+64=128 amplitude/phase states.

Algorithm: The principles of the algorithm are shown as examples in the amplitude/phase diagram, according to FIG. 4. The continuous, bold lines represent the actually measured amplitude/phase states; the amplitude/phase states of all other lines (dashed) are calculated according to the method of the invention.

First, the amplitude and phases of 64 amplitude/phase states (32, i) are measured, where i=0, . . . 63 of the amplitude state 32; and the amplitudes and phases of the 64 amplitude/phase states (j, 32) are measured, where j=0, . . . 63 of the phase state 32.

For each amplitude state to be reconstructed, one proceeds from the curve of the measured amplitude state (in this example, amplitude state 32), which is shifted by the corresponding amplitude state ΔΦ within the measured phase state (in this example, phase state 32).

Correspondingly, for each phase state to be reconstructed, one proceeds from the curve of the measured phase state (here, phase state 32), which is shifted by the corresponding phase state ΔΦ in the measured amplitude state (in this example, amplitude state 32).

In this manner all amplitude states and phase states of the amplitude/phase diagram may be reconstructed.

Figure 4:
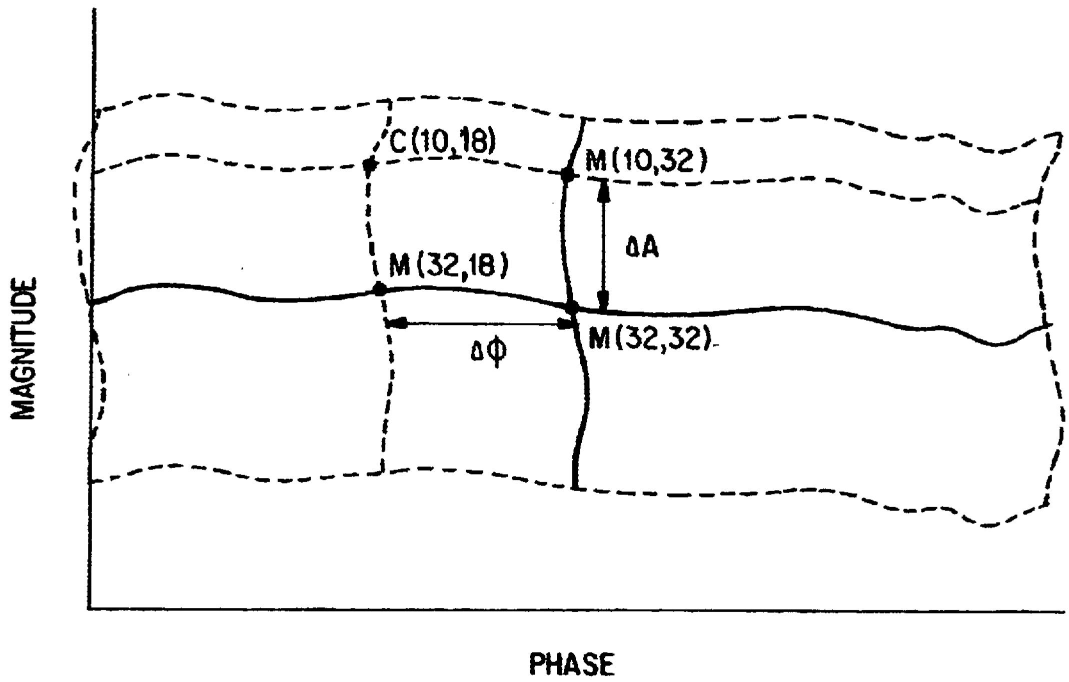
FIG. 4 depicts an amplitude/phase diagram t o illustrate a synthesis algorithm according to principles of the invention.

The algorithm for the case, shown in FIG. 4, is presented in equations (1) and (2). The abbreviation "M" is used for all measured amplitude/phase states; the abbreviation "C", for all calculated states. Below is an example of the amplitude/phase state (10/18) to be calculated:

Amplitude:

$$C(10, 18)=M(32, 18)+(M(10, 32)-M(32, 32)) \quad (1)$$

Phase:

$$C(10, 18)=M(10, 32)+(M(32, 18)-M(32, 32)) \quad (2)$$

If generalized for an arbitrary amplitude/phase state x, y to be reconstructed for the measured amplitude state A and the measured phase state B, the result is the following algorithm:

Amplitude:

$$C(x, y)=M(a, y)+(M(x, b)-M(a, b)) \quad (3)$$

Phase:

$$C(x, y)=M(x, b)+(M(a, y)-M(a, b)). \quad (4)$$

The choice of the amplitude state a to be measured and the phase state b to be measured is carried out advantageously on a totally measured amplitude/phase diagram of a transmit/receive module. All possible combinations of lines and columns are tested as to which combination yields the best accuracy, i.e., for all possible combinations of lines and columns all amplitude/phase states are calculated, and the agreement with the measured values is compared. A measure for the accuracy is the deviation of the calculated values from the related measured values (e.g., by way of the RMS error). Then the resulting optimal combination from the amplitude state and the phase state can be used to reconstruct the amplitude/phase diagrams of the remaining transmit/receive modules of the antenna (as stated above, there can be more than 1,000 transmit/receive modules).

However, it is also possible to measure in total amplitude the amplitude/phase diagram of one of the transmit/receive modules according to a specific number of arithmetically reconstructed amplitude/phase diagrams (e.g., 10) and to determine on this basis a new optimal combination of amplitude state and phase state.

Figure 5:
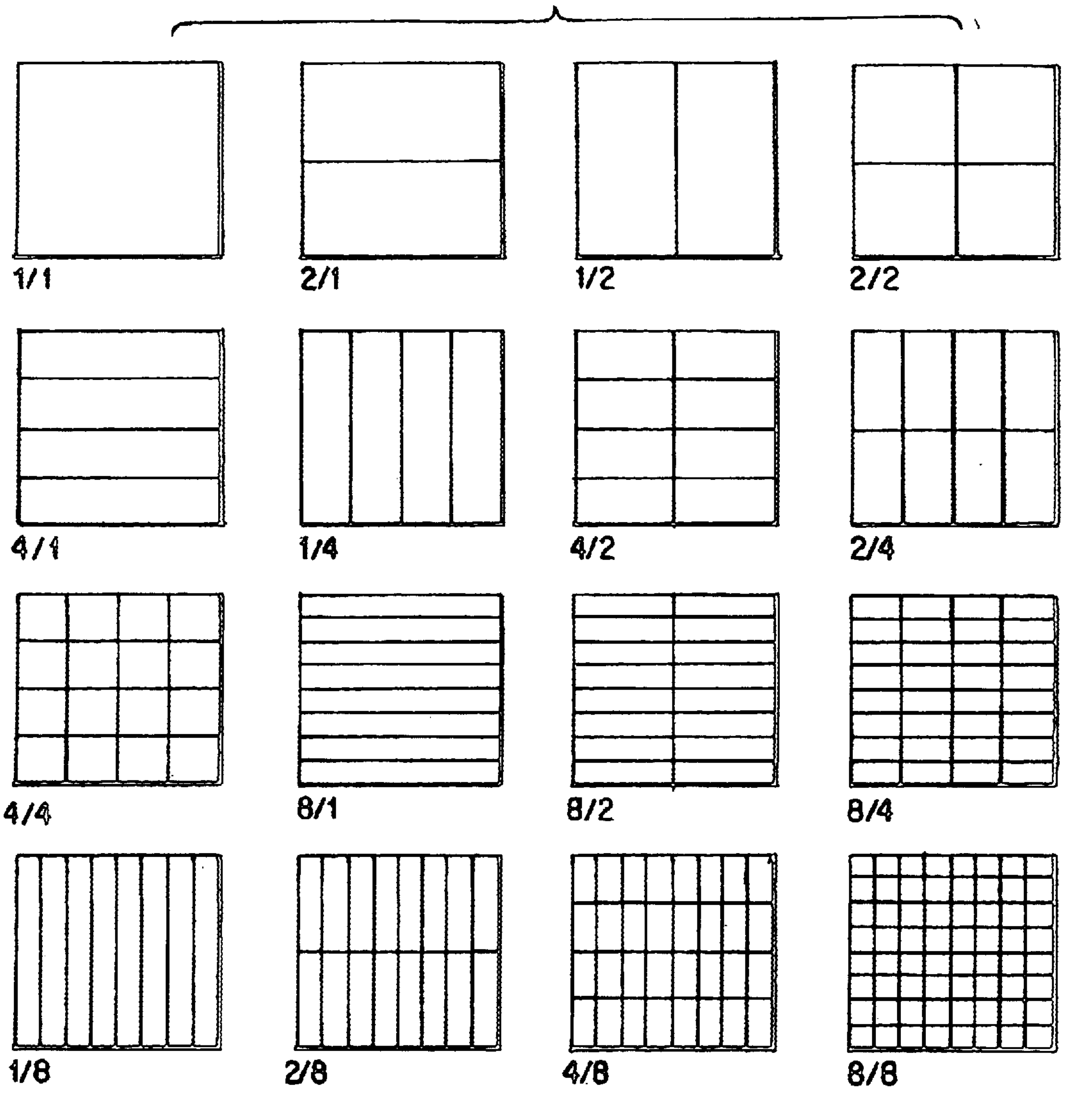
FIG. 5 depicts several examples for segmenting an amplitude/phase diagram.

Independently of the type of transmit/receive module and the required accuracy, it is also possible not to apply the described algorithm uniformly to the entire amplitude/phase diagram, but rather to divide the latter into several segments, whereby then the described algorithm is applied separately to each segment. The segmentation is increased incrementally until the required agreement between the calculated values and the measured values is reached. To this end, FIG. 5 shows 16 possible segmentations for the amplitude diagram, whereby the segmentation is increased progressively, going from top left to bottom right.

It is important that for each segment the actually measured amplitude state and the actually measured phase state can be selected individually for each segment. It is also advantageous here to determine for each segment the optimal combination of amplitude state and phase state on the basis of a totally measured amplitude/phase diagram.

Figure 6:
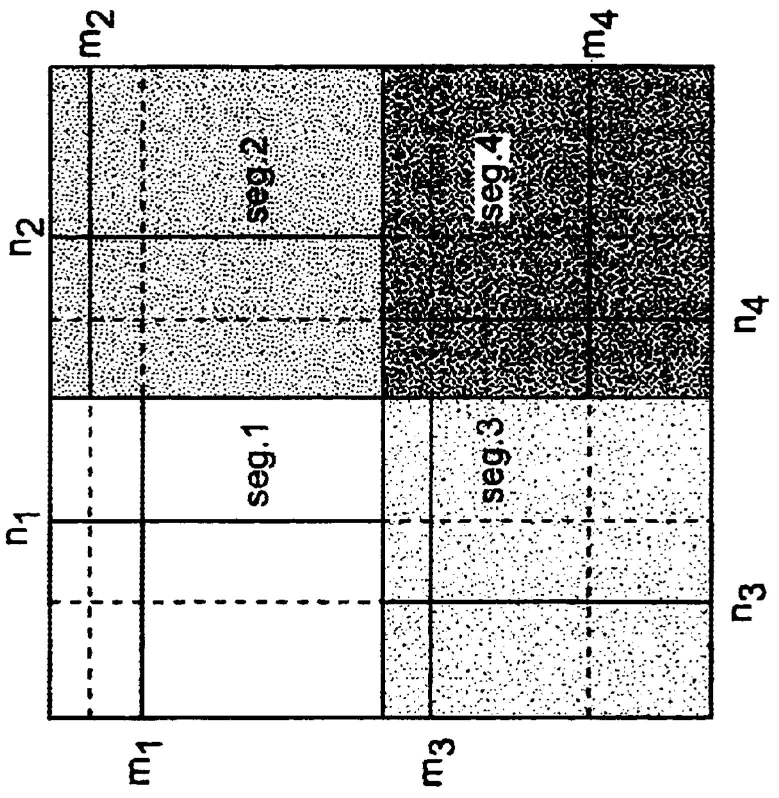
FIG. 6 depicts another example for segmenting an amplitude/phase diagram with the lines and columns that are actually measured.

In this respect, FIG. 6 shows an example where the amplitude/phase diagram of the transmit/receive module is divided into four segments, seg1 to seg4, configured in two columns and two lines. For each segment a combination of amplitude state and phase state m1/n1 to m4/n4 is fixed individually, whose individual amplitude/phase states are measured. Thus, to reconstruct the other amplitude/phase states, only the amplitude/phase states lying on the continuous lines are entered. The amplitude/phase states lying on the dashed lines are not necessary for the calculation and are not measured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reconstructing an amplitude/phase diagram of a transmit/receive module for a phased-array antenna comprising:

measuring an amplitude and a phase of amplitude/phase states (a, i), where $i=i_{min} \ldots i_{max}$ of an amplitude state a;

measuring an amplitude and a phase of amplitude/phase states (j, b), where $i=j_{min} \ldots j_{max}$ of a phase state b;

reconstructing amplitude values of an amplitude state x by shifting measured amplitude values of said amplitude state a by a difference ΔA of measured amplitude values of amplitude/phase states (x, b) and (a, b), which within said phase state b belong simultaneously to either said amplitude state x or said amplitude state a; and reconstructing phase values of a phase state y by shifting measured phase values of said phase state b by a difference ΔΦ of measured phase values of amplitude/phase states (a, y) and (a, b), which within said amplitude state a belong simultaneously to either said phase state y or said phase state b.

2. The method of claim 1, wherein said amplitude/phase diagram is divided into a plurality of segments and wherein reconstructing said amplitude state x and reconstructing said phase state y are carried out for each of said plurality of segments.

3. A method for reconstructing an amplitude/phase diagram of a transmit/receive module for a phased-array antenna comprising:

step for measuring an amplitude and a phase of amplitude/phase states (a, i), where $i=i_{min} \ldots i_{max}$ of an amplitude state a;

step for measuring an amplitude and a phase of amplitude/phase states (j, b), where $j=j_{min} \ldots j_{max}$ of a phase state b;

step for reconstructing amplitude values of an amplitude state x by shifting measured amplitude values of said amplitude state a by a difference ΔA of measured amplitude values of amplitude/phase states (x, b) and (a, b), which within said phase state b belong simultaneously to either said amplitude state x or said amplitude state a; and step for reconstructing phase values of a phase state y by shifting measured phase values of said phase state b by a difference ΔΦ of measured phase values of amplitude/phase states (a, y) and (a, b), which within said amplitude state a belong simultaneously to either said phase state y or said phase state b.

4. A method for reconstructing an amplitude/phase diagram of a transmit/receive module for a phased-array antenna comprising:

measuring M(a, i) for an amplitude state a, wherein M(a, i) represents an amplitude and a phase of amplitude/phase states (a, i), where $i=i_{min} \ldots i_{max}$;

measuring M(j, b) for a phase state b, wherein M(j, b) represents an amplitude and a phase of amplitude/phase states (j, b), where $j=j_{min} \ldots j_{max}$;

calculating C(x, y) for an amplitude state x, wherein C(x, y) represents calculated amplitude/phase states (x, y) and wherein $$C(x, y)=M(a, y)+(M(x, b)-M(a, b));$$

and calculating C(x, y) for a phase state x, wherein $$C(x, y)=M(x, b)+(M(a, y)-M(a, b)).$$

5. In a system for reconstructing an amplitude/phase diagram of a transmit/receive module for a phased-array antenna, a computer-readable memory for storing data for access by an application program comprising:

a data structure stored in said computer-readable memory, said data structure including information used by said application program and including:

a plurality of measured amplitude/phase fields; and a plurality of calculated amplitude/phase fields.

6. The data structure of said computer readable memory of claim 5, further comprising a plurality of segment fields.

7. The data structure of said computer readable memory of claim 6, wherein said plurality of calculated amplitude/phase fields further comprises a plurality of segmented calculated amplitude/phase fields.

* * * * *